O. E. HINTZ.
PROCESS OF MEASURING THE ENERGY OF ENGINES WITHIN THE CYLINDER.
APPLICATION FILED MAY 11, 1909.

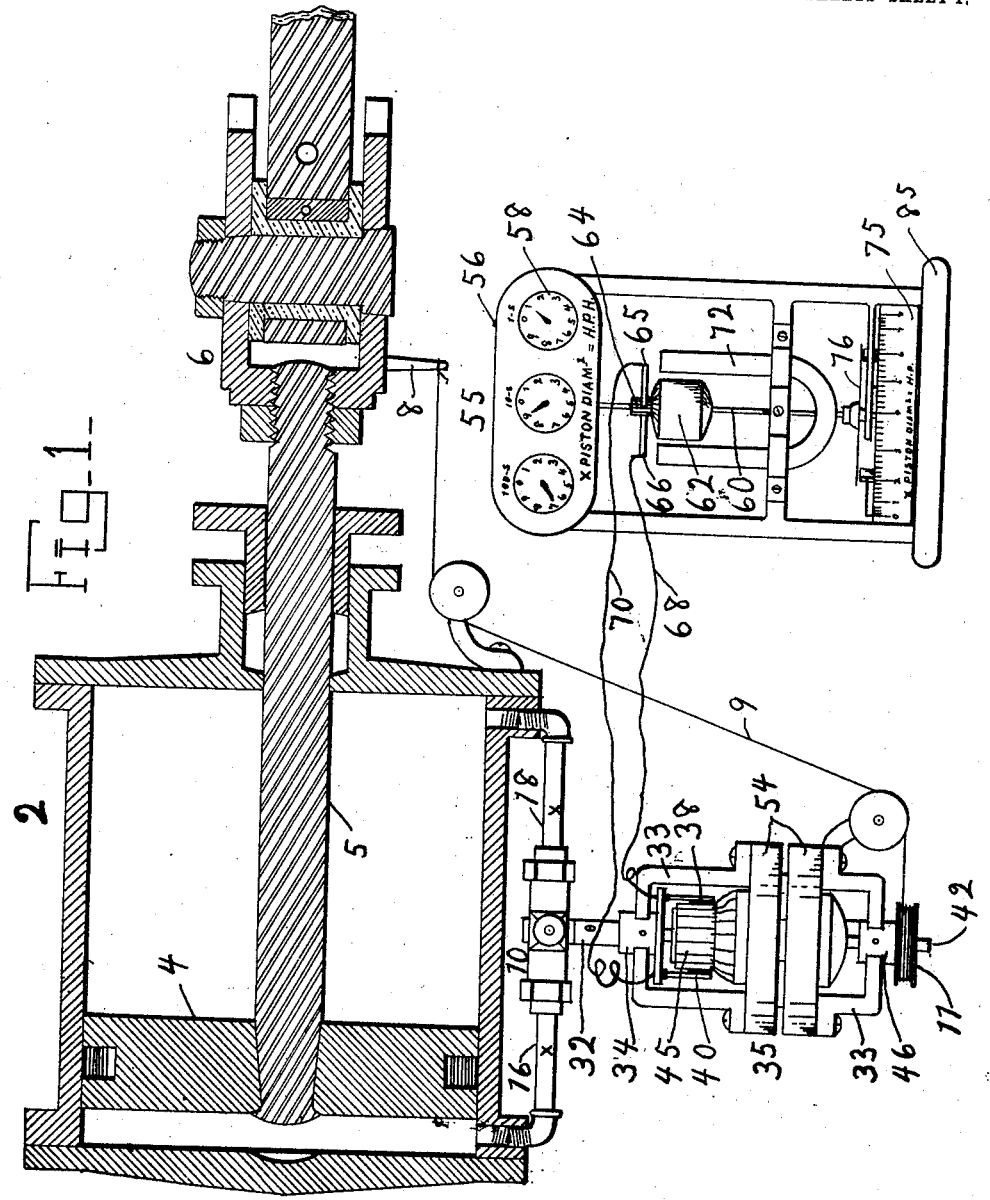

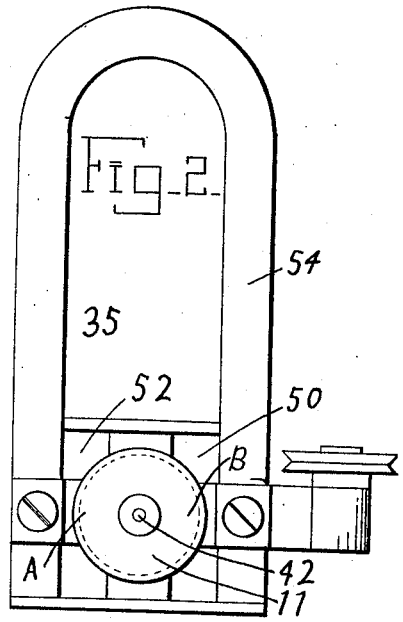
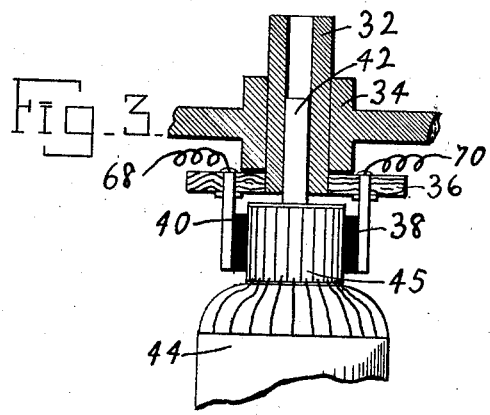
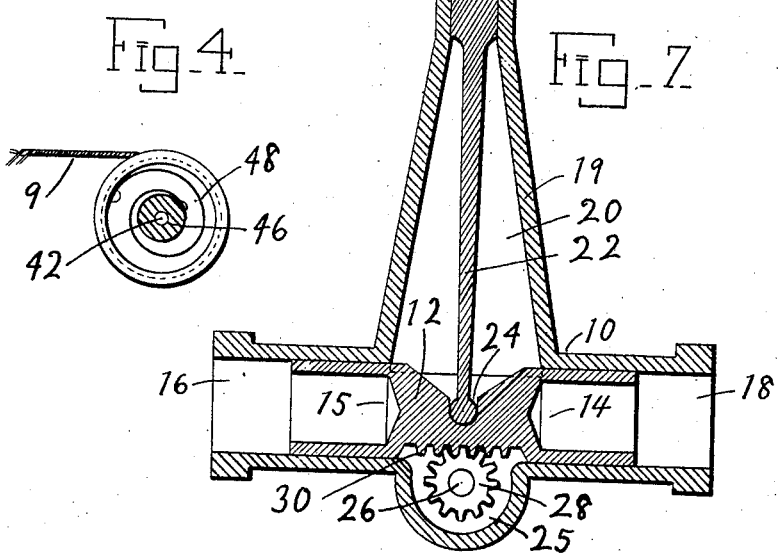

1,053,393.

Patented Feb. 18, 1913

3 SHEETS—SHEET 3.

Witnesses
M. J. Connere
O. M. Frick

Inventor
Otto E. Hintz
W. M. Cady
Attorney

UNITED STATES PATENT OFFICE.

OTTO E. HINTZ, OF BELLEVUE, IOWA.

PROCESS OF MEASURING THE ENERGY OF ENGINES WITHIN THE CYLINDER.

1,053,393. Specification of Letters Patent. Patented Feb. 18, 1913.

Application filed May 11, 1909. Serial No. 495,365.

*To all whom it may concern:*

Be it known that I, OTTO E. HINTZ, citizen of the United States, residing at Bellevue, in the county of Jackson and State of Iowa, have invented certain new and useful Improvements in Processes of Measuring the Energy of Engines Within the Cylinder, of which the following is a specification.

The object of my invention is to provide a process or method to correctly measure the energy of fluid pressure engines whereby all the useful or positive forces are added and all of the negative forces subtracted therefrom and the net active forces measured.

The method consists in applying the difference of the pressure of the opposite sides of the piston of an engine, it is desired to measure, to determine a current of electricity generated in a magneto by the varying motion of said piston in proportion to the agencies, pressure and motion, which determine the energy of the engine, and thus by measuring said current, measuring the energy.

The following specification, when read in connection with the drawings accompanying the same and forming a part hereof, will describe the manner in which I accomplish this process of measurement and also describe the construction of a machine by which this process can be conveniently carried out and the end sought to be accomplished can be attained.

Figure 5:
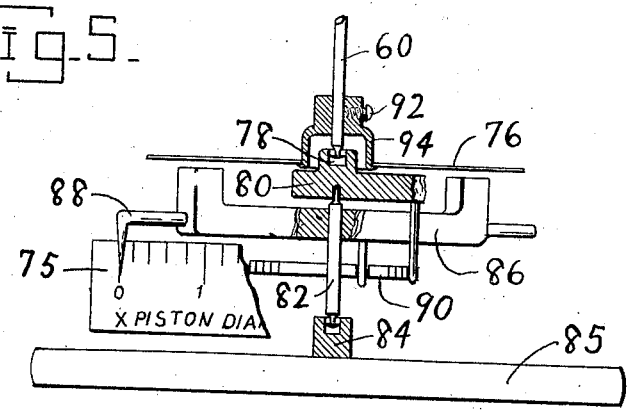
Figure 6:
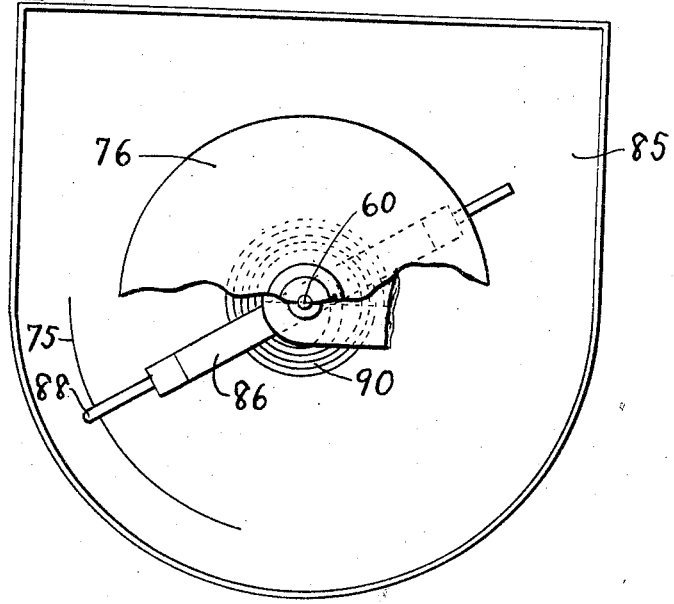

Figure 1 is a longitudinal section of an engine cylinder and a top view of the magneto and also a front view of the meter forming a part of this device. Fig. 2 is an end view of the magneto shown in Fig. 1. Fig. 3 is a detail of the commutator and oscillatable brush-yoke forming a part of the magneto. Fig. 4 is an end view of the pulley on the end of the armature shaft. Fig. 5 is a part section and part elevation with part cut away of the dial of the horse-power indicator. Fig. 6 is a top view of Fig. 5. Fig. 7 is a longitudinal section through line X—X in Fig. 1.

Referring to the drawings, 2 designates an engine cylinder which in this instance is adapted to be operated by steam, but my method hereinafter to be described may be used equally as well with any other pressure engines. In the cylinder is located an ordinary reciprocating piston 4 with the piston rod 5 connected to the cross head 6. In the cross head 6 is rigidly fixed a stud 8 to which is attached a cord 9 leading to a pulley 11 on the shaft of the armature of the magneto, hereinafter to be described.

To one side of the cylinder 2 is suitably mounted a cylinder 10 a section of which is shown in Fig. 7. In this cylinder is located a piston 12 preferably terminating at its ends in cups 14 and 15. The ends of the piston 12 are in communication with the corresponding ends of the engine cylinder 2 by tubes 16 and 18. On one side of the cylinder 10 projects a casing 19 forming a chamber 20 in the top of which chamber is rigidly secured a spring 22 which terminates at its lower end in a socket 24 in the piston 12. There is also in the base of the cylinder 10 a chamber 25, in which is mounted a shaft 26 upon which is rigidly secured a pinion 28 adapted to engage with a rack 30 integral with the piston 12 and operated thereby.

The shaft 26 projects from the end of the chamber 25 and into a hollow shaft 32 which forms a part of the magneto 35. The shaft 32 is mounted in a bearing 34 and suitably supported by the frame 33 and to its opposite end is secured a brush-yoke 36 upon which are mounted the brushes 38 and 40. One end of the hollow shaft 32 provides a bearing for the end of the shaft 42 upon which is mounted an armature 44 with its commutator 45, upon the opposite sides of which rest the brushes 38 and 40 for the purpose of collecting the current of electricity generated in the armature 44, upon the other end of the shaft 42 supported in the bearing 46 in the frame 33 is mounted a pulley 11.

Inside of the pulley 11 is fastened, at its outer end preferably, a spiral spring 48, the other end of which is secured to one end of the bearing 46. The cord 9 by the movement of the piston 4 rotates the pulley 11 and with it the armature 44 in one direction, and the spring 48 rotates said armature in the opposite direction to correspond with the reciprocatory motion of the piston. The armature 44 is rotatably mounted between the pole pieces 50 and 52 attached to a horseshoe magnet 54.

The manner of operating this portion of this device is substantially as follows: Steam is admitted in the cylinder to one side of the piston 4 which drives the piston forward with the rod 5 and cross head 6 carrying with it the post 8. This movement draws the cord 9, and since the cord 9 is attached to the pulley 11 it rotates said pulley, and with it the armature 44 in one direction, say clock-wise. While this motion is rotating the armature, at the same time the pressure of the steam through the pipe 16 against the piston 12 in the cup 15, forces the piston 12 forward against the action of the spring 22 an amount in proportion to the varying pressure in the cylinder 2, thus rotating in one direction, say clock-wise, the shaft 26 and by means of the engagement of the rack 30 with the pinion 28 upon the shaft 26, this motion is communicated as before described, to the brush-yoke 36, and the brushes 38 and 40, moving them away from the neutral point on the commutator 45 on the armature 44 in the direction clock-wise. As the voltage of the magneto at any given speed of the armature 44 is always in proportion to the displacement of the brushes 38 and 40 from the neutral points on the commutator 45, and as the voltage of a magneto is for any given location of the brushes 38 and 40 in proportion to the speed of its armature 44, it is evident that the voltage at any instant will be in proportion to the combined effect of these two conditions, location of the brushes 38 and 40 with respect to the neutral points A and B, and speed of rotation of the armature 44, and these two conditions before described, being due respectively to the varying pressure in the cylinder 2 and the varying speed of the piston 4 of the engine at the same instant. Considering these two conditions governing the voltage, it is further evident that the voltage will be in direct proportion to the agencies, pressure and motion, which determine the horse-power of the engine. Having completed this stroke, the piston 4 starts in the opposite direction, the pressure having now been introduced on the opposite side of the piston 4, the pressure will pass through the tube 18 into the cup 14 of the piston 12 and force it in the opposite direction and with it the brushes 38 and 40. The direction of rotation having also been changed, it is evident that the current from the magneto will be in the same direction as before, because the direction of the current of a magneto depends upon two things, viz., direction of rotation of the armature 44, and also which side of the neutral points A and B the brushes 38 and 40 are respectively located with regard to said rotation, the utility of this fact will appear hereafter. Upon this return stroke when the piston has reached that point where the exhaust, having been shut off from the forward side, and the live steam in the rear of the piston 4 having been cut off some time before, the piston 4 then reaches the point before the end of the stroke where the compression pressure is greater than the working pressure. The compression pressure entering through the tube 16 into the cup 15 of the piston 12 reverses that piston and this moves the brushes on the opposite side of the neutral point before the direction of rotation of the armature 44 has changed, thus when this pressure is greater, the current from the magneto will be in the opposite direction tending to reverse the meter hereinafter to be described, which is as it should be, because this compression pressure does not represent active work, but it negative work, that is it tends to retard the engine, thus consuming energy from it.

The meter 55 by which the horse-power-hours are registered and the horse-power is indicated consists of a register 56 composed of any ordinary form of decimal wheels (not shown) and a dial plate 58 which registers the total horse-power hours. In order to operate the register mechanism there is provided a shaft 60 upon which is mounted an armature 62 with its commutator 64, upon which are brushes 65 and 66. These are electrically connected to the armature 44 of the magneto 35 by means of the wires 68 and 70 and the brushes 38 and 40 upon the commutator 45.

On the opposite sides of the armature 62 are located the opposite poles of a magnet 72 which form the magnetic field against which acts the current that is delivered into the armature 62 from the magneto 35, to cause its rotation in the direction in which the register adds when the current is in one direction, and in the direction in which the register subtracts when the current is in the opposite direction, now as has been hereinbefore described, the magneto 35 will furnish current in one direction when the pressure in the cylinder 2 is doing work and that the current will be in the opposite direction when there exists in the cylinder a back pressure or compression greater than the forward pressure, it has also been shown that the voltage of the current will always be in proportion to the agencies which determine the power of the engine to be measured therefore the net result of all the conditions described is that the register of the meter 55 will correctly register the work done by the engine.

For the purpose of indicating directly the horse power of the engine at a glance upon the dial 75, the lower end of the shaft 60 is rotatably mounted upon a jewel 78 supported by the member 80 suitably secured to the frame 85 of the meter. In the lower side of the member 80 is found a bearing for the upper end of the shaft 82 the lower end of which is pivotally mounted on a jewel in a second supporting member 84 rigidly connected with the frame 85 of the meter. Upon the shaft 82 is secured a magnet 86, in one end of which is fastened the index 88 which indicates upon the dial 75 the horse power actually performed by the engine.

To the magnet 86 is secured one end of a hair spring 90, the other end of which is secured to the member 84. This serves to hold the magnet 86 and thereby the index 88 in a zero position on the dial 75. On the shaft 60 is secured a metal disk 76 by set screw 92 in the hub 94. As the shaft 60 is rotated from left to right, which is the forward direction of the meter, the magnetic torque or pull between the magnet 86 and the disk 76 would tend to rotate the magnet 86 in the same direction against the action of the hair spring 90 in proportion to the speed of the disk 76 which is in proportion to the horse power of the engine, and thus cause the index 88 to indicate upon the dial 75 the horse power of said engine at any time.

It will be seen by this method that there will be recorded on the register only the net or working horse-power of the engine after having substracted all of the negative, exhaust or counter forces and that it is not necessary to use the register in connection with the engine but since it is operated by electricity, it may be set in the office of the superintendent where it can be consulted at any time and by it measure the exact working force which is developed from a given amount of fuel.

Having now described my process what I claim is:—

1. The process of measuring the energy of a fluid pressure engine directly from the forces acting within the cylinder of the engine, which consists in generating a current of electricity controlled by and proportional to the motion of the engine piston, modifying the current in value and direction by and in accordance with the effective pressure acting upon the piston within the cylinder, and measuring the murrent thus modified.

2. The process of measuring the energy of a fluid pressure engine directly from the forces acting only within the cylinder of the engine, which consists in generating an electric current controlled by and proportional to the motion of the piston, varying the electric current by and in accordance with the varying pressure acting upon said piston within the cylinder, and measuring said electric current so generated and varied to indicate the total energies acting upon the piston of the engine within the cylinder.

3. The process of measuring the energy of fluid pressure engines directly from the forces acting upon the piston within the cylinder of the engine, which consists in producing a varying current of electricity controlled by and proportional to the varying motion of the piston of the engine, further varying said current of electricity by and in accordance with the effective pressure acting upon said engine piston within the engine cylinder, and measuring the resultant quantity of electricity so generated and varied to indicate the energy of the engine.

4. The process of measuring the energy of fluid pressure engines from the forces acting upon the piston within the cylinder, which consists in generating an unequal alternating current of electricity controlled by and proportional to the motion of the piston, modifying said current by the pressure difference acting upon the opposite sides of the piston within the cylinder, and measuring such current to indicate the total energy of the engine.

In testimony whereof I affix my signature in presence of two witnesses.

OTTO E. HINTZ.

Witnesses:
M. M. CADY,
W. B. KEOGH.